(No Model.) 6 Sheets—Sheet 1.
E. THEISEN.
CONDENSER.
No. 445,096. Patented Jan. 20, 1891.
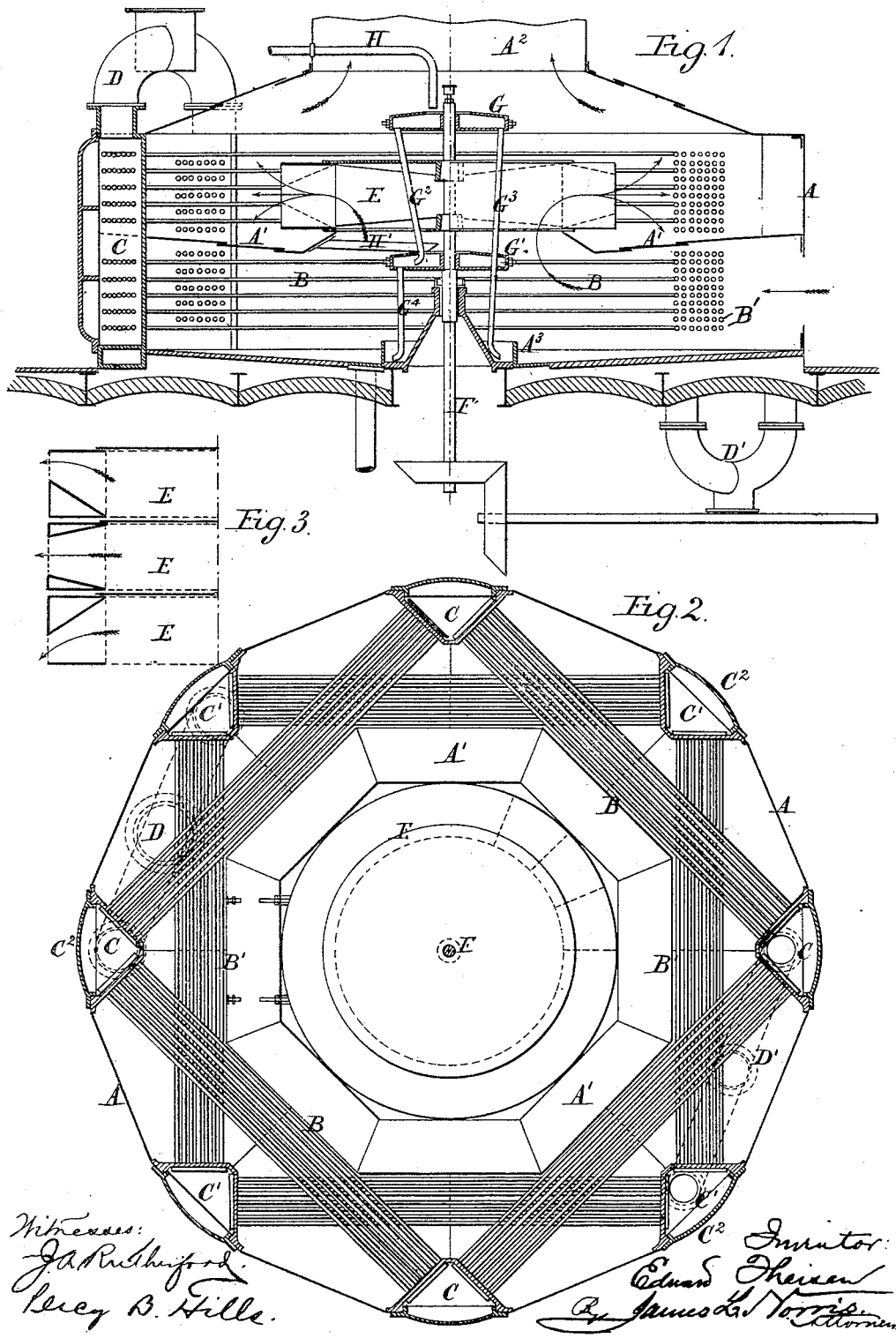

(No Model.) 6 Sheets—Sheet 2.
E. THEISEN.
CONDENSER.
No. 445,096. Patented Jan. 20, 1891.
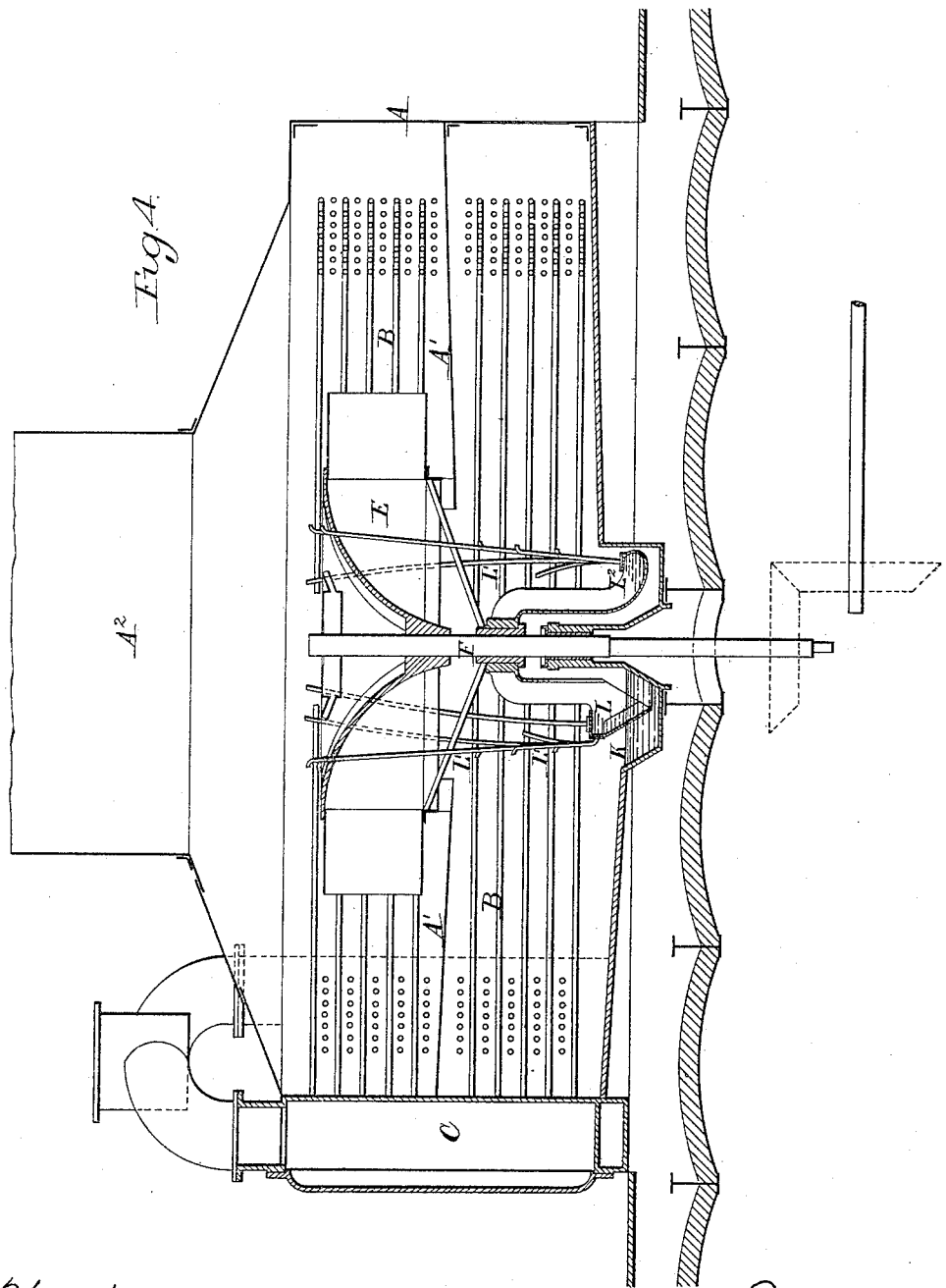

(No Model.) 6 Sheets—Sheet 3.
E. THEISEN.
CONDENSER.
No. 445,096. Patented Jan. 20, 1891.
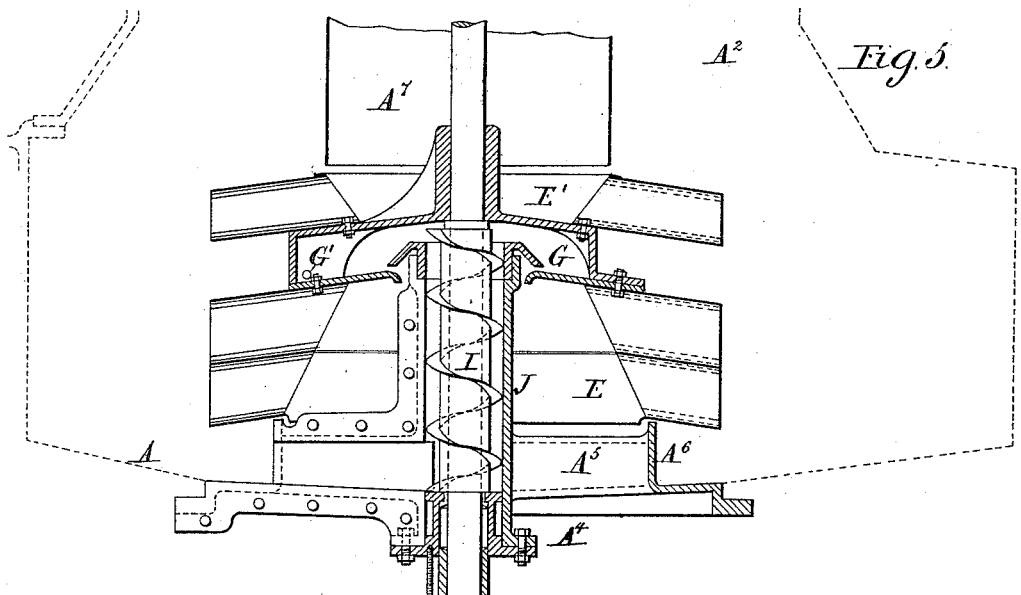
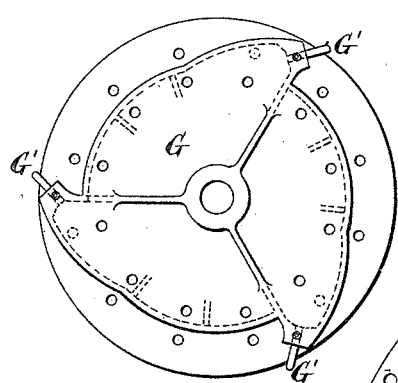
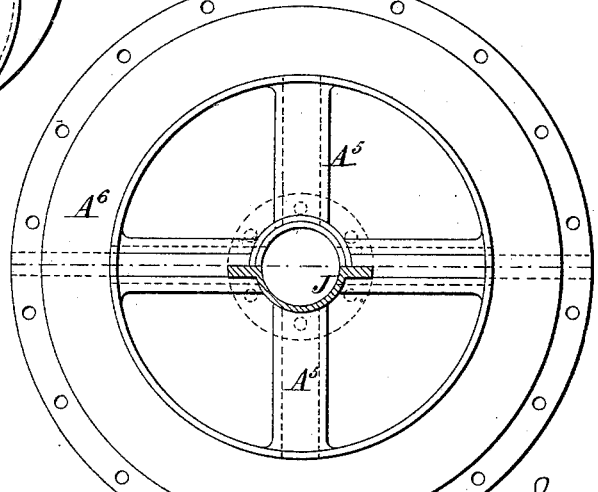

(No Model.)  6 Sheets—Sheet 4.
E. THEISEN.
CONDENSER.

No. 445,096. Patented Jan. 20, 1891.

Witnesses:
J. A. Rutherford.
Percy B. Hills.

Inventor:
Edward Theisen
By James L. Norris.
Attorney.

(No Model.) 6 Sheets—Sheet 5.
E. THEISEN.
CONDENSER.
No. 445,096. Patented Jan. 20, 1891.
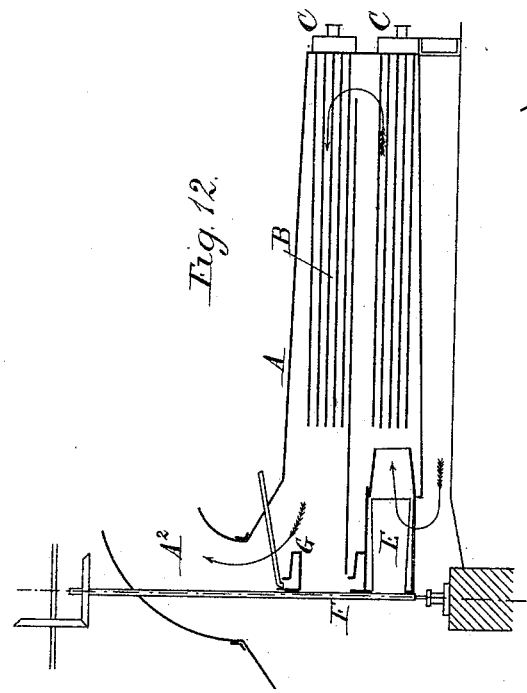
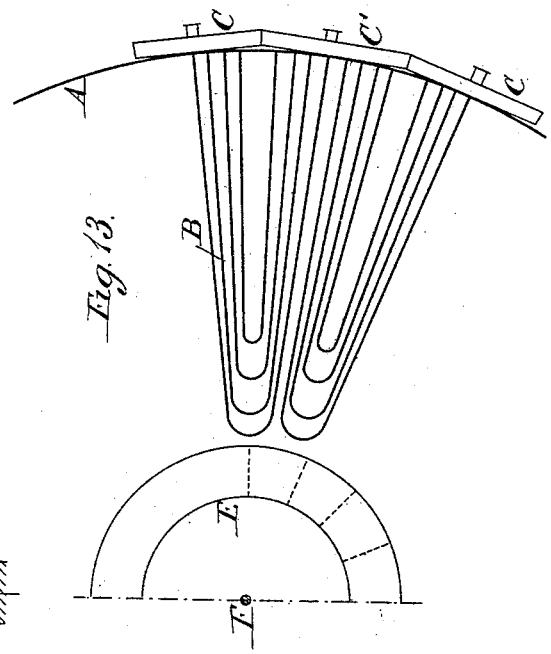
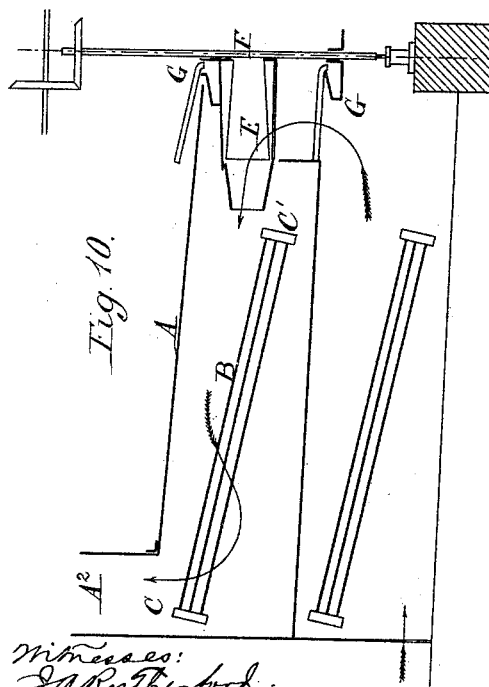
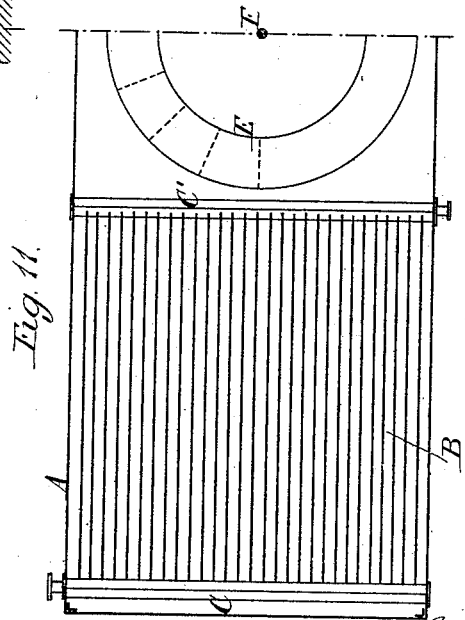

(No Model.) 6 Sheets—Sheet 6.
E. THEISEN.
CONDENSER.
No. 445,096. Patented Jan. 20, 1891.
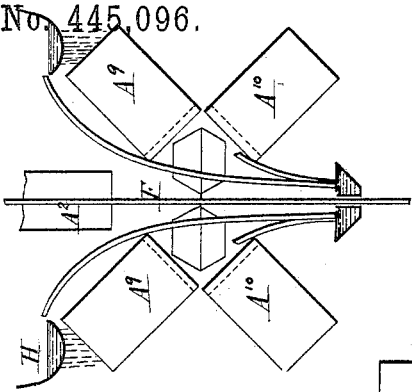
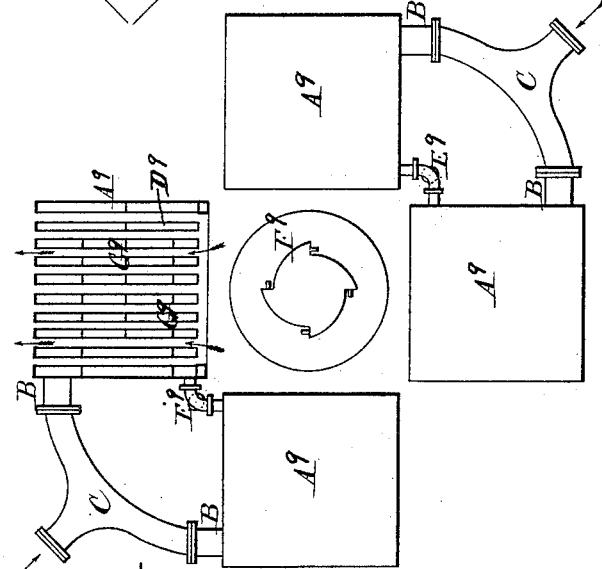
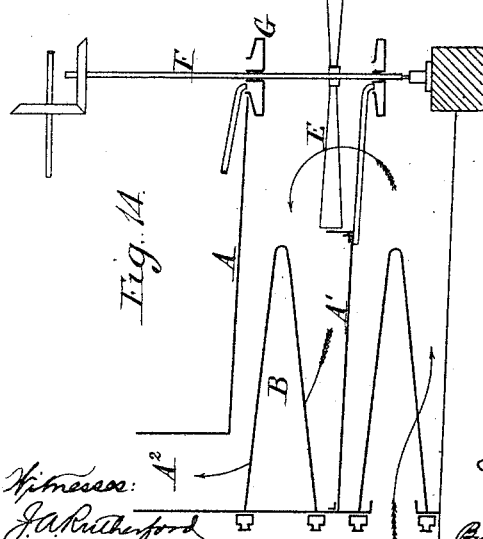
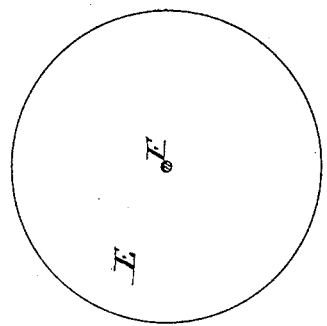

UNITED STATES PATENT OFFICE.

EDUARD THEISEN, OF SINZIG, GERMANY.

CONDENSER.

SPECIFICATION forming part of Letters Patent No. 445,096, dated January 20, 1891.

Application filed May 14, 1890. Serial No. 351,766. (No model.)

*To all whom it may concern:*

Be it known that I, EDUARD THEISEN, a citizen of the United States, residing at Sinzig-on-the-Rhine, in the German Empire, have invented new and useful Improvements in Condensers, of which the following is a specification.

My invention relates to an improved construction of evaporative surface condensers adapted for use in connection with a steam-engine, evaporating, vacuum, and other pans, or in connection with other apparatus where condensation is desirable or essential, whereby I obtain such an efficient condensing action as to obtain a more or less perfect condensation.

My invention consists, mainly, in combining with a net-work of tubes, through which the steam or other vapor is made to pass, a revolving fan, situated centrally within the said net-work, for producing air-currents, and a supply of water so arranged that while the water is supplied in a shower over the net-work of tubes, so as to maintain the outer surfaces thereof in a perfectly-wet condition, the fan causes currents of cold air to pass rapidly over the wet surfaces of the tubes, so as to produce a very effective evaporation of the water, resulting in a correspondingly-effective absorption of heat and condensation of the steam.

The apparatus for carrying out the above-described mode of operating can be constructed in a variety of ways, of which I will proceed to describe same, by way of example, with reference to the accompanying drawings.

Figure 8:
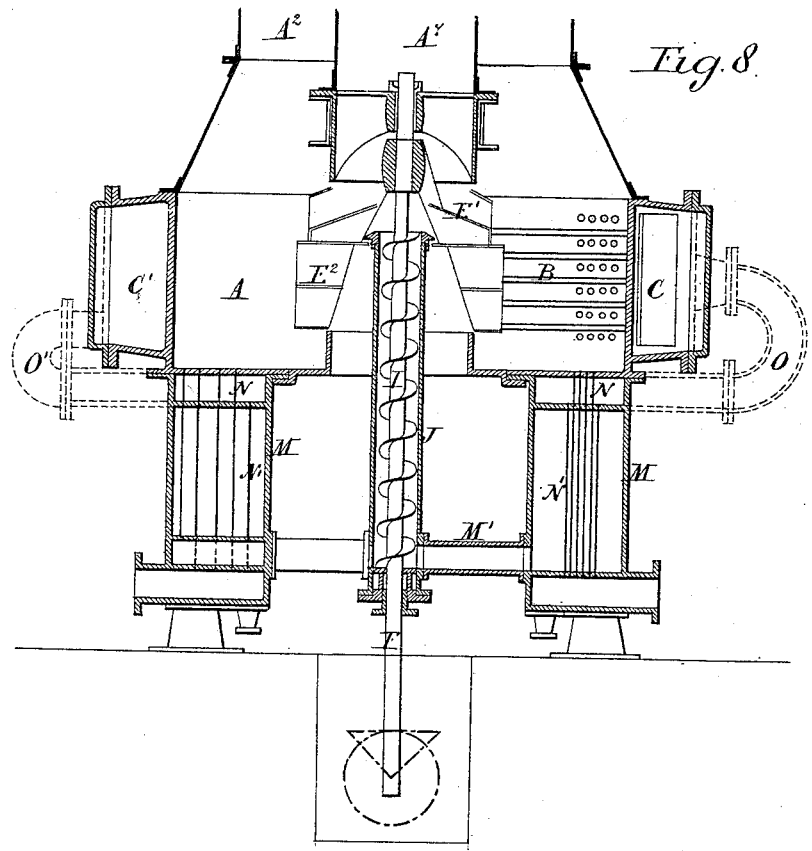
Figure 9:
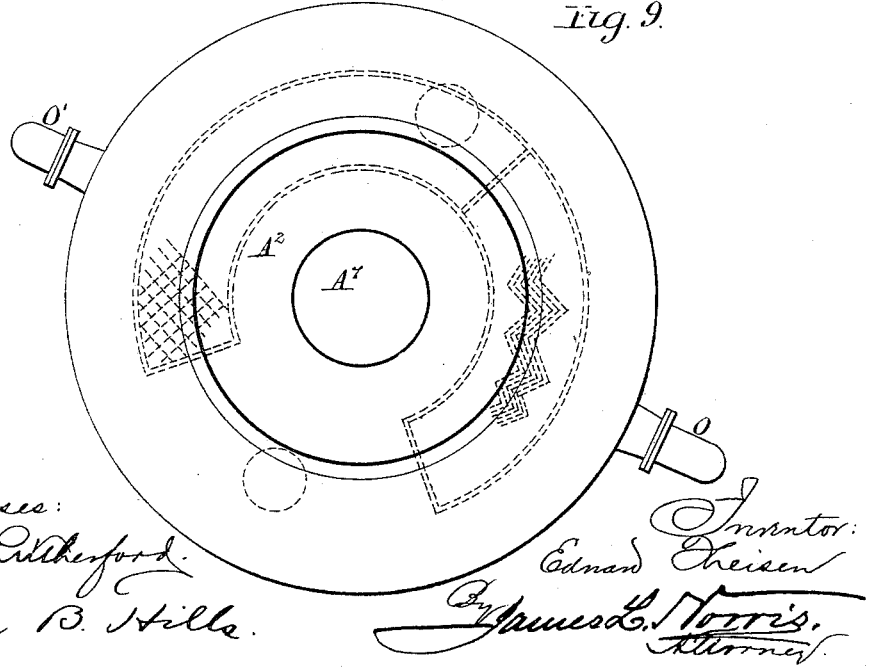

Figure 1 shows a vertical section, and Fig. 2 a sectional plan, of one arrangement. Fig. 3 is a detail sectional view of the same. Fig. 4 is a vertical section of another arrangement. Fig. 5 is a vertical sectional detail view showing a different construction of the fans. Figs. 6 and 7 are detail plan views of the construction shown in Fig. 5. Figs. 8 and 9 are a vertical section and plan view, respectively, of still another arrangement. Figs. 10 and 11 are detail vertical section and plan, respectively, of a modification of the condensing-tubes; and Figs. 12, 13, 14, and 15 are similar views of further modifications of the same. Fig. 16 is a diagram plan of another construction of evaporating-chamber, and Fig. 17 is a detail vertical section of a modification of the water-supply.

Within a casing A are arranged two groups of tubes B B'. These groups are here shown arranged in squares, the corners of which are formed by boxes C C', into the sides of which the ends of the tubes are fixed, so that the tubes of the group B all communicate with the boxes C, while those of the group B' all communicate with the boxes C'. The steam or other vapor to be condensed is simultaneously introduced into both groups through the branched pipe D, which communicates with one of the boxes C and one of those C', while the exhaust is connected by a branch pipe D' with the two opposite boxes C and C' of each group, so that the steam has to pass half-way round each square. In the central space inclosed by these groups is a centrifugal blowing-fan E, mounted on a vertical shaft F, which fan is here shown to draw in air at the under side, so that the outer air drawn into the casing from the outside through openings in the casing is first made to pass through between the lower condensing-tubes before entering the fan, and it is then propelled by the latter between the upper portions of the tubes. In order to effect an equal distribution of the air throughout the tubes, it is preferred to make the consecutive compartments into which the fan is divided of the several forms shown in the sections at Fig. 3, so that one compartment directs the air horizontally, while another directs it upward, and a third directs it downward. For insuring the proper circulation of the air in the above-described manner, partition-plates A' are by preference provided between the upper and lower portions of the tubes extending from the casing to the fan. Upon the shaft of the latter are fixed two disk-shaped receptacles G G', which are filled with water through pipes H H', and from which the water is thrown by centrifugal action over the upper and lower sets of tubes at the same time that these are subject to the currents of air, as above described. The supply of water being so regulated as to be just sufficient to keep the steam-tubes wet, a most efficient condensation by surface evaporation is obtained, so that practically the whole of the steam will be condensed and only water and uncondensable gases will be withdrawn through the exhaust-pipe D'. The air-blast, laden with watery vapor resulting from the evaporation, escapes through the flue $A^2$, and, if desired, the distilled water thus produced can be condensed in any suitable manner for use. The partition-plates A' are by preference made to turn on hinges and are held in position by suitable catches, as shown at Fig. 2, so that when required they can be opened in order to give access to the groups of pipes for clearing them of any deposit.

Instead of providing separate water-supplies for the two receptacles G G', only the lower one need be so supplied, and upon the upper side of this may be fixed tubes sloping slightly outward, as indicated at $G^2$, Fig. 1, communicating with the upper vessel, so that the centrifugal action will cause the requisite supply of water to be forced up into the upper receptacle through the tubes $G^2$; or the upper receptacle may in this case be entirely dispensed with and the water be thrown direct from the tubes $G^2$ over the upper set of condensing-tubes. The excess of water flowing down from the condensing-tubes is collected in the bottom of the casing A, and is led back to the supply-tank, if necessary; or the surplus water may be collected in a circular trough $A^3$, from which it may be scooped up by tubes $G^3$ $G^4$, passing down, respectively, from the receptacle G G', the water being made to rise through these tubes by centrifugal action, and thus all raising by means of pumps or screw-blades be avoided.

The boxes C C' of the two groups of tubes are provided on the outside with removable covers $C^2$ for gaining access to the interior thereof and to the interior of the tubes B B'.

Fig. 4 shows a vertical section of an arrangement similar to the foregoing, the main difference being that in place of using the water-vessels G the water to be supplied to the condensing-tubes is fed into an annular trough K at the bottom of the casing, as shown on the left-hand side, from which it is drawn by a conical shell L, provided with internal ribs carried by arms from the fan-shaft F, and having a number of tubes L' inclined slightly outward and also in a helical direction, which tubes have their discharge-orifices at different heights, so that by the rapid rotation of the shell L the centrifugal force drives the water up its sides and through the tubes L' onto the condensing-tubes; or instead of the shell L may be used an annular trough, as at $L^2$, on the right-hand side, into which the water is supplied from the bottom of the casing, as also by a spout from the partition A'.

Instead of arranging the fan so as only to take in air at the lower side, as described, it may be formed with an inlet-opening also on the upper side, to which air would be supplied by a pipe passing centrally down the discharge-flue $A^2$. There may also be provided two or more fans for supplying the necessary air-blast, as shown in the vertical section at Fig. 5. In this arrangement there is a double fan E, taking its supply from below through an opening $A^4$ of the casing, and propelling the same through the lower portion of the condensing-tubes B, while an upper fan E' receives its air-supply from above and propels it through the upper portion of the tubes.

For the supply of water to the tubes a turbine-shaped vessel G, with discharge-openings G', (shown in plan at Fig. 6,) is supplied with water by an Archimedean screw I, fixed on the fan-shaft and revolving in a cylindrical casing J, the bottom of which receives the water through hollow arms $A^5$ from the part $A^6$ of the casing, so that the excess of water falling down from the condensing-tubes is conveyed up to the vessel G again by the screw I, together with the further quantity required to make good the loss by evaporation, this being introduced into the bottom of the casing.

The part $A^6$ of the casing, the hollow arms $A^5$, and the cylindrical casing J, which are shown in plan at Fig. 7, are all conveniently formed in two castings bolted together. The vessel G, fixed to the shaft F, serves as attachment to the fans E and E'.

$A^7$ is the pipe for supplying the air to the upper fan E'.

Figs. 8 and 9 show a vertical section and sectional plan of an arrangement similar to the foregoing, but in which there is combined with the evaporative surface condenser an ordinary surface condenser, through which the steam is first passed before entering the evaporative surface condenser. For this purpose there is formed below the casing A an annular vessel M, divided by a vertical partition into two chambers and by horizontal partitions into three compartments. The middle compartment communicates with the bottom of the casing A by tubes or passages N, so that the water flows from the casing A through such tubes or passages into the middle compartment, whence it is supplied through the branches M' to the casing J of the screw I. The upper and lower compartments of M are connected by tubes or passages N' in close proximity to the passages N, the bottom compartment being connected on the right-hand side to the supply of steam to be condensed and on the left-hand side with the exhaust. The top compartment communicates on the right-hand side by a pipe O with the box C, to which the condensing-tubes B are connected, and on the left-hand side by a pipe O' with the box C', with which the condensing-tubes communicate on the opposite side. Thus with this arrangement the steam to be condensed enters the right-hand bottom compartment, rises through the tubes N' into the upper compartment, being cooled by the water descending through the tubes or passages N, and is then led by the pipe O into the evaporative surface condenser. Any steam remaining uncondensed, together with the water of condensation, flows off from the box C' on the opposite side through pipe O' into the upper compartment of M, thence through the tubes N' into the bottom compartment, being further subjected to the condensing and cooling action of the water flowing through the pipes N, and is finally drawn off to the exhaust.

The fans and water-supply to the evaporative surface condenser are similar in arrangement to the previously-described construction. $A^7$ is the tube in the discharge-flue for supplying the top fan E' with air.

The tubes or passages N N' may be arranged in a variety of ways for providing alternate water and steam passages side by side. Thus they may be concentric passages of zigzag or other form, as indicated on the right-hand side of Fig. 9, or they may be separate tubular passages formed by fixing angular or otherwise corrugated sheet metal together, as shown on the left-hand side of Fig. 9, or they may be separate concentric tubes, as in ordinary surface condensers.

Fig. 10 shows a part vertical section, and Fig. 11 a part plan of a modification, in which the condensing-tubes B are differently arranged, being formed into separate groups, communicating at C with a box for the inlet of steam and at C' with a box for the discharge. The air is drawn in through the lower groups by the fan E, as in the first arrangement, and is propelled through the upper group to the discharge-flue $A^2$. The water is supplied by vessels G, as before.

In the modification shown in part vertical section and part plan at Figs. 12 and 13 the condensing-tubes B are made of a V shape, the ends being connected, respectively, to the supply-boxes C and the exhaust-boxes C'. In this case the fan E draws the air from below the lower tier of tubes and propels it through both tiers to the central discharge-flue $A^2$.

Figs. 14 and 15 show, respectively, a part vertical section and part plan of a modification in which the V-shaped tubes B are arranged with their limbs placed vertically, and in which, in place of a fan with centrifugal action, a fan E with helical blades is employed for propelling the air in the axial line, the periphery of the fan being inclosed by a ring fixed to the partition A'.

It will be readily understood that the above-described arrangements might be modified by causing the steam or vapor to be condensed to flow in contact with the outer surfaces of the pipes, while the water and air-blast are made to flow in contact with the interior surfaces thereof. Fig. 16 shows a diagram plan of such an arrangement, in which $A^9$ $A^9$ $A^9$ $A^9$ are closed chambers, connected at B with the steam-supply branches C and having tubes $D^9$ passing through them, while at $E^9$ they communicate with the exhaust.

The centrifugal apparatus for distributing the water and air being situated at $F^9$, the water and air are propelled through the tubes $D^9$, while the steam to be condensed circulates through the casing A in contact with the outer surfaces of the tubes, suitable baffle-plates $G^9$ being provided to insure equal distribution.

The chambers are preferably placed so that the tubes are in an inclined position, so that the water will flow down them, and there may be two sets of chambers arranged as shown at Fig. 17, the upper set $A^9$ being inclined toward the fans and water-supply and receiving the water from troughs H, supplied by the centrifugal jets, while the lower ones $A^{10}$ are inclined away from the fans and receive their supply directly from the jets.

Having thus described the nature of my invention and the best means I know for carrying the same into practical effect, I claim—

1. In apparatus for simultaneously condensing vapors and evaporating liquids, the combination of a fan for producing air-blast, sets of pipes arranged round such fan, and a supply of liquid made to flow by centrifugal action and with the air-blast in contact with the one surface of such pipes, while the steam or vapor to be condensed is made to flow in contact with the outer surface thereof, substantially as described.

2. In apparatus for simultaneously condensing vapors and evaporating liquids, the combination of a set or sets of pipes through which the vapor to be condensed is made to flow, a vertical revolving shaft carrying a fan or fans situated centrally within the set or sets of tubes for propelling currents of air in contact with the pipes, and a vessel or vessels carried by the said shaft, which is or are supplied with water or other liquid to be evaporated, and from which the water is propelled onto the said tubes by centrifugal force, substantially as described.

3. In apparatus for simultaneously condensing vapors and evaporating liquids, the combination of a set or sets of pipes through which the vapor to be condensed is made to flow, a vertical revolving shaft carrying a fan or fans situated centrally within the set or sets of tubes for propelling currents of air in contact with the pipes, and a vessel or vessels carried by the said shaft, which is or are charged with water or other liquid to be evaporated, and which carries a number of rising pipes through which the water is propelled by centrifugal force, substantially as described.

4. In apparatus for simultaneously condensing vapors and evaporating liquids, the combination of a set or sets of pipes through which the vapor to be condensed is made to flow, a revolving shaft carrying a fan or fans centrally within the set or sets of pipes for propelling air in contact with the pipes, means for distributing water over the outer surfaces of the pipes, and a surface condenser situated below the said apparatus, through which the steam is made to pass before entering the before-mentioned pipes, such surface condenser being supplied with water from the upper condensing apparatus, substantially as herein described.

5. In apparatus for condensing steam and other vapors, the combination of groups of pipes B B', connected to boxes C C', for the supply of steam and for the exhaust, a fan or fans E on a vertical shaft F, a vessel L, carried by the said shaft and charged with water, and pipes L² on the vessel L, through which water is discharged by centrifugal action onto the pipes B B', substantially as described.

In testimony whereof I have signed my name to this specification, in the presence of two subscribing witnesses, this 14th day of April, A. D. 1890.

EDUARD THEISEN.

Witnesses:
CHAS. D. ABEL,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*